United States Patent [19]
Jackson et al.

[11] Patent Number: 5,321,251
[45] Date of Patent: Jun. 14, 1994

[54] ANGLED OPTICAL FIBER FILTER FOR REDUCING ARTIFACTS IN IMAGING APPARATUS

[75] Inventors: Todd A. Jackson, Pittsford; Robert H. Hibbard, Fairport, both of N.Y.

[73] Assignee: Eastman Kodak Company, Rochester, N.Y.

[21] Appl. No.: 40,727

[22] Filed: Mar. 31, 1993

[51] Int. Cl.⁵ ................................. G02B 6/08
[52] U.S. Cl. ................. 250/208.1; 250/227.28; 385/120
[58] Field of Search ............... 250/208.1, 216, 227.20, 250/227.28, 227.29; 358/901; 359/498, 554; 385/114–117, 120

[56] References Cited

U.S. PATENT DOCUMENTS

| | | | |
|---|---|---|---|
| 4,185,888 | 1/1980 | Quelle, Jr. | 350/96.25 |
| 4,247,165 | 1/1981 | Versluis | 385/120 |
| 4,408,230 | 10/1983 | Tamura | 358/213 |
| 4,586,780 | 5/1986 | Chern et al. | 385/120 |
| 4,674,834 | 6/1987 | Margolin | 350/96.25 |
| 4,760,421 | 7/1988 | Margolin | 355/1 |
| 4,760,839 | 8/1988 | Nagasaki | 128/6 |
| 4,762,391 | 8/1988 | Margolin | 350/96.25 |
| 4,776,667 | 10/1988 | Yoshida et al. | 350/96.25 |
| 4,815,816 | 3/1989 | Schneider | 350/96.25 |
| 4,867,530 | 9/1989 | Sedlmayr | 350/96.27 |
| 4,904,049 | 2/1990 | Hegg | 385/120 |
| 4,914,349 | 4/1990 | Matsui et al. | 385/120 |
| 4,930,861 | 6/1990 | Okabe et al. | 385/117 |
| 4,946,238 | 8/1990 | Sashin | 350/96.27 |
| 4,964,692 | 10/1990 | Prescott | 350/96.24 |
| 4,977,450 | 12/1990 | Yokota | 358/98 |
| 4,978,195 | 12/1990 | Takano et al. | 350/96.27 |
| 5,061,036 | 10/1991 | Gordon | 385/116 |
| 5,077,821 | 12/1991 | Makel et al. | 385/120 |
| 5,163,117 | 11/1992 | Imanishi et al. | 385/120 |
| 5,256,868 | 10/1993 | Kaplan et al. | 250/208.1 |

Primary Examiner—David C. Nelms
Assistant Examiner—Stephone B. Allen
Attorney, Agent, or Firm—David M. Woods

[57] ABSTRACT

An optical fiber array is used as a blur filter in imaging apparatus to limit high spatial frequencies incident upon an image sensor, and thereby to reduce undersampling artifacts. The optical fiber array includes optical fibers disposed in the path of incident image light at an angle to the optical axis of the sensor such that the optical fibers composing the array emit an annular pattern of light over adjacent photosites, thereby producing a blurred image. The annular pattern of light has a mean radius that remains substantially the same regardless of changes in the optical aperture of the imaging path, with only the thickness of the annular pattern changing with aperture.

11 Claims, 5 Drawing Sheets

ANGLED OPTICAL FIBER FILTER FOR REDUCING ARTIFACTS IN IMAGING APPARATUS

FIELD OF INVENTION

The present invention pertains to an optical low-pass filter used in the optical path of an electronic imaging system to reduce aliasing, or undersampling, effects.

BACKGROUND OF THE INVENTION

An electronic imaging system typically produces a signal output corresponding to a viewed object by spatially sampling an image of the object in a regular pattern with an array of photosensitive elements, such as, for example, with a charge-coupled device (CCD) solid-state image sensor. In such an imaging system, it is well-known that detail components in the object which contain frequencies too high to be analyzed within the sampling interval of the sensor contribute to the amplitudes of lower frequency components, and thereby produce imaging errors commonly referred to as aliasing or undersampling artifacts. In particular, if spatial detail being imaged contains a high frequency component of a periodicity smaller than the pitch (periodicity) of each neighboring photosensitive picture element of the solid state image sensor, the subsequent detection of this high frequency component tends to result in a spurious signal due to aliasing.

In general, the electronic imaging system can minimize aliasing if its optical section has a frequency response that cuts off, or filters out, the higher frequency content of the object. As a result, the optical section generally employs an optical low pass filter to substantially reduce the high frequency component contained in the spatial detail of the image received by the image sensor. It is thus well-known in the prior art that the design of electronic imaging systems involves a trade-off between image sharpness and the susceptibility of the imaging system to aliasing distortions or undersampling artifacts.

To limit these artifacts, an optical filter such as, for example, a birefringent blur filter has become a common component in consumer color video cameras. U.S. Pat. Nos. 4,101,929 and 4,896,217 show typical examples of such filters. Such a filter is typically placed between a lens and the image sensor to provide a low-pass filter function which reduces the spatial frequency content of the object at frequencies above the Nyquist frequency of the photosensitive elements. This makes the imaging system less susceptible to aliasing distortion. For example, for many available sensors wherein equal pixel densities in each of the sensed colors provide that each of the sensed colors have the same Nyquist frequency, an achromatic low-pass, or "blur", function is effective in minimizing aliasing distortion. Such a function can readily be provided by a birefringent filter.

The birefringement blur filter is typically composed of filter plates manufactured from a crystalline material like quartz that exhibits a dual refraction effect when the crystal axes of the filter plates are oriented at an angle with respect to the plate surface. In this orientation, a randomly polarized ray of light passing through such a filter plate emerges as two separated polarized rays. The combination of several such plates produces a multiple spot pattern from each incident point in the image. If this spot pattern distributes light energy over multiple photosensitive elements, then the effect of a blur is obtained. This will limit the optical transfer function of the system at spatial frequencies above the Nyquist frequency of the photosensitive elements. However, this type of filter suffers from the drawback that it is costly and complicated to manufacture. In addition, a practical birefringent filter tends to be rather large and thick. Indeed, the thickness required to achieve the desired blur requires a lens with a long back focal length in order to make room for the blur filter in the optical path. Space limitations often do not allow such an optical structure, and lens design becomes unduly complicated. Finally, since such a filter requires randomly polarized, or non-polarized, light, a polarizing filter cannot be allowed in such a system to obtain well known photographic polarizing effects.

As can be appreciated from the foregoing remarks, there is a need in the art for a physically small blur filter that is inexpensive and relatively simple to manufacture, yet produces a tightly controlled blur pattern that is not dependent upon polarization techniques. As an alternative to the birefringent blur filter, copending Ser. No. 88/040,713, entitled "An Optical Fiber Filter for Reducing Artifacts in Imaging Apparatus" and filed on even date herewith by common assignee, describes the use of an array of optical fibers as a blur filter to reduce undersampling artifacts in an imaging system. Such an imaging system is shown in FIG. 1, in which an image of an object 1 is generated by a lens 2 and directed through an optical fiber array 3 upon an image sensor 4, which is composed of a two-dimensional array of photosites 5. The optical fiber array 3 is arranged in a two-dimensional structure of straight optical fibers 6 such that each fiber receives image light over a discrete image pixel area and integrates the light by multiple reflections, thereby removing high frequency content within the pixel area. In addition, by separating the optical fiber array 3 from the sensor 4 (by a distance d), each fiber 6 emits an exit cone of light 7 over adjacent photosites 5. The combined effect of light integration and the cone-shaped spread of light exiting each fiber can be controlled (by varying the distance d) to provide a controlled blur pattern on the photosites 5, which blocks higher spatial frequencies from reaching the image sensor 4.

While an optical fiber blur filter is simpler and less complicated to manufacture than a birefringement filter, and while it produces a blur pattern that is independent of the state of polarization, it has a drawback in that the angle of the exit cone 7 is dependent upon the optical aperture of the optical system. This happens because the exit cone angle of light from each fiber is equal to the angle of the entrance cone. In an optical system with a variable aperture, the entrance cone angle will vary with the size of the aperture. This is shown schematically in FIGS. 2A and 2B for two entrance cones, set by respective positions of a diaphragm 8, to one optical fiber 6. For typical camera lenses, the aperture can vary between f/numbers of 2.8 and 32, and the cone angle of light introduced into the fibers will vary between 10.1° and 0.89°, respectively. This provides the angle variation in exit cone 7a and 7b seen in FIG. 2A and 2B, respectively. The blur spot size over the photosites 20 therefore will vary almost 10 to 1 at the extremes of a typical aperture adjustment. This is shown for a configuration of four neighboring photosites in FIGS. 3A and 3B. A small blur spot 9a in FIG. 3A corresponds to the image coverage for a small aperture (FIG. 2A) and a large blur spot 9b in FIG. 3B corresponds to the image coverage for a large aperture (FIG. 2B).

The problem is clear from an inspection of FIGS. 3A and 3B. The amount of blur is highly dependent upon the aperture, and can disappear altogether if the smaller blur spot 9a is wholly within one photosite. Moreover, to maintain a constant blur spot diameter, the spacing d between the sensor 4 and the optical fiber array 3 would have to vary with the aperture. This is mechanically difficult to accomplish.

SUMMARY OF THE INVENTION

The solution to this problem is to minimize the output cone angle variation with aperture by disposing the fiber axis at an angle to the optical axis of the system. Accordingly, the invention includes imaging apparatus that generates an image signal from incident image light, and has its higher spatial frequencies limited by an angled fiber optic blur filter to reduce undersampling artifacts. The apparatus includes an image sensor for generating the image signal from an array of photosites positioned in an optical axis, and an array of optical fibers, oriented along a common fiber axis, interposed in the path of the incident image light with the fiber axis disposed at an angle to the optical axis such that the optical fibers emit light over adjacent photosites so as to substantially blur the image, thereby producing a blurred image upon the sensor with limited higher spatial frequency content.

The advantages of using an angled optical fiber blur filter according to the invention include the usual advantages of using an optical fiber blur filter, that is, a simpler and less complicated manufacturing process; a tightly controlled blur pattern that is independent of the wavelength, the polarization state, and the focal length of the optical system; as well as the special advantage due to the invention of a blur pattern that maintains a substantially constant mean radial coverage regardless of the lens aperture being used.

BRIEF DESCRIPTION OF THE DRAWINGS

The prior art and the invention are described in relation to the drawings, wherein.

DESCRIPTION OF THE PREFERRED EMBODIMENTS

Since electronic imaging apparatus, particularly electronic cameras using solid state sensors, are well known, the present description will be directed in particular to elements forming part of, or cooperating more directly with, apparatus in accordance with the present invention. Elements or techniques not specifically shown or described herein may be selected from those known in the art. For instance, geometrical relationships of the optical components are not shown or described in detail, except where necessary to describe the invention. Moreover, since bundled arrays of optical fibers are commonly available, well-known structures, the appropriate manufacturing, assembly, and packaging techniques, as well as the specifications of useful fiber materials, are well known in the art and will not be addressed in any detail herein.

Figure 1:
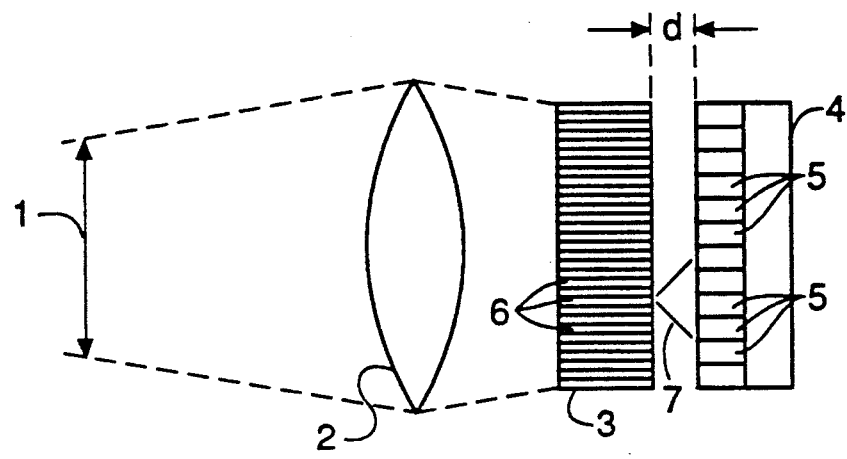
FIG. 1 is an illustration of prior imaging apparatus utilizing an optical fiber array as a blur filter.
Figure 2A:
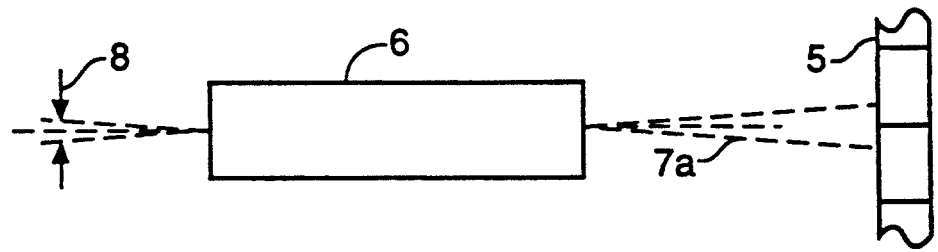
FIGS. 2A and 2B are diagrams of an optical fiber in the fiber array of FIG. 1, showing the dependence of the exit cone angle of each fiber upon the aperture of the imaging apparatus.
Figure 2B:
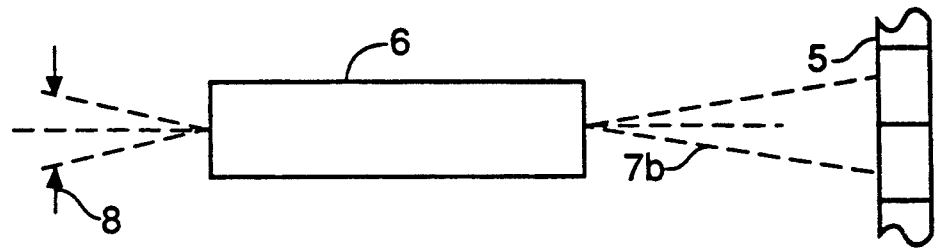
Figure 3A:
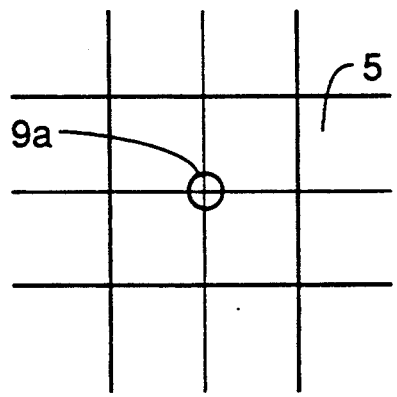
FIGS. 3A and 3B are diagrams of the blur patterns produced by the fibers of FIGS. 2A and 2B, shown superimposed over the photosites of a sensor.
Figure 3B:
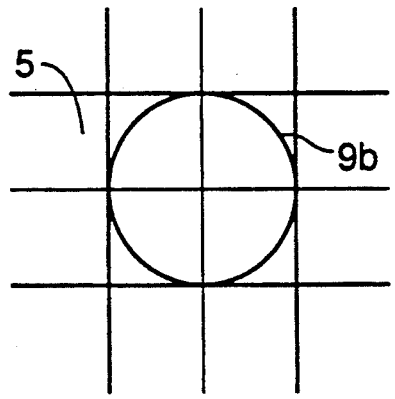
Figure 4:
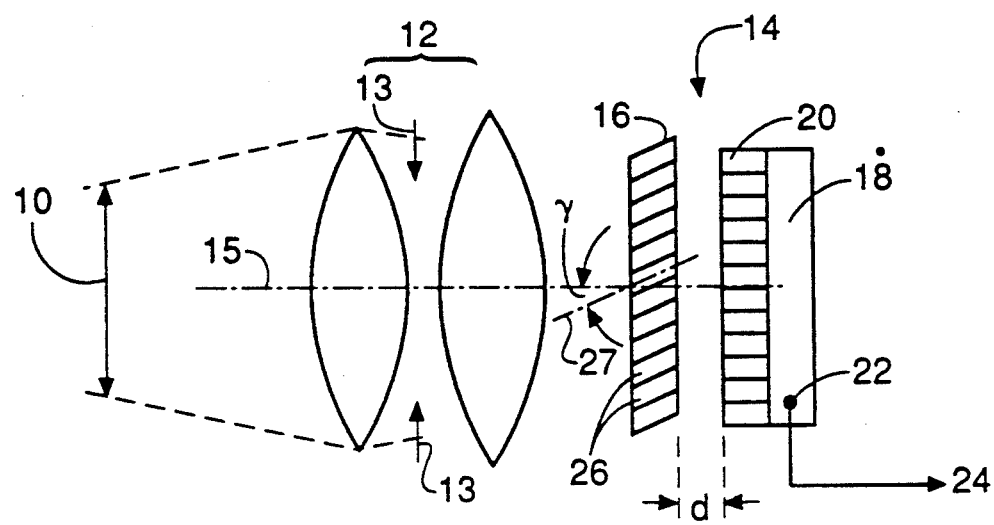
FIG. 4 is an illustration of imaging apparatus utilizing an angled optical fiber array as a blur filter in accordance with the invention.

Referring to FIG. 4, an image of an object 10 is generated by a lens system 12 and focused through a diaphragm 13 (shown schematically by arrows) upon imaging apparatus 14, which senses a blurred version of the image. The imaging apparatus 14 is disposed relative to the lens system 12 along an optical axis 15. An optical fiber array 16 is shown for use in the imaging apparatus 14 to transmit the image between the lens 12 and an image sensor 18. Importantly, the optical fiber array 16 functions in the imaging apparatus as a blur filter for blocking higher spatial frequencies from reaching the sensor 18. The image sensor 18 is comprised of a two-dimensional array of photosites 20 and an output section 22 for outputting an image signal 24. The optical fiber array 16 includes a two-dimensional structure of optical fibers 26 interposed along the optical axis 15 in the path of image light, and separated by a distance d from the image sensor 18. The optical fiber array 16 is fabricated such that a longitudinal axis 27 of each fiber 26 is disposed at an angle 7 with respect to the optical axis 15 of the lens system 12. As better shown in partial cross-section in FIG. 5, and in partial perspective in FIG. 6, each fiber 26 is surrounded by a sheath of cladding 28, and bound with the other fibers into a fixed orientation. That is, the fibers 26 are carefully arranged so that their terminations occupy the same relative positions in both of the bound ends of the bundle. Such a bundle of fibers is said to be coherent, and is capable of transmitting images. Thus, in the imaging apparatus 14 of FIG. 4, image data obtained from areas (pixels) of the object 10 is coherently transmitted to the sensor 18. Ordinarily, the fiber optic array 16 will be a fused, rigid plate separated from the sensor 18, as shown by FIG. 4, by the spacing d.

Each fiber 26 collects light at its input face 30 over a range of angles $\beta$, and internally reflects the collected light to its output face 32. Given the case where an image is focused on the optical fiber array 16, each fiber 26 will collect the light from one pixel of the image. All sub-pixel detail information is lost as the light is conveyed along the fiber. The light emitted from the output face 32 of each fiber 26 is substantially uniform in intensity with high frequency spatial content less than the fiber's dimension having been lost by the integrating nature of the fiber. In this way, the effect of low pass filtering is obtained. The collection angle $\beta$ is a function of the actual aperture value set by the diaphragm 13, with the collection angle $\beta$ becoming smaller for smaller aperture values. The maximum value the collection angle $\beta$ is also dependent upon an aperture value, referred to as the numerical aperture, established by the fiber itself.

Figure 5:
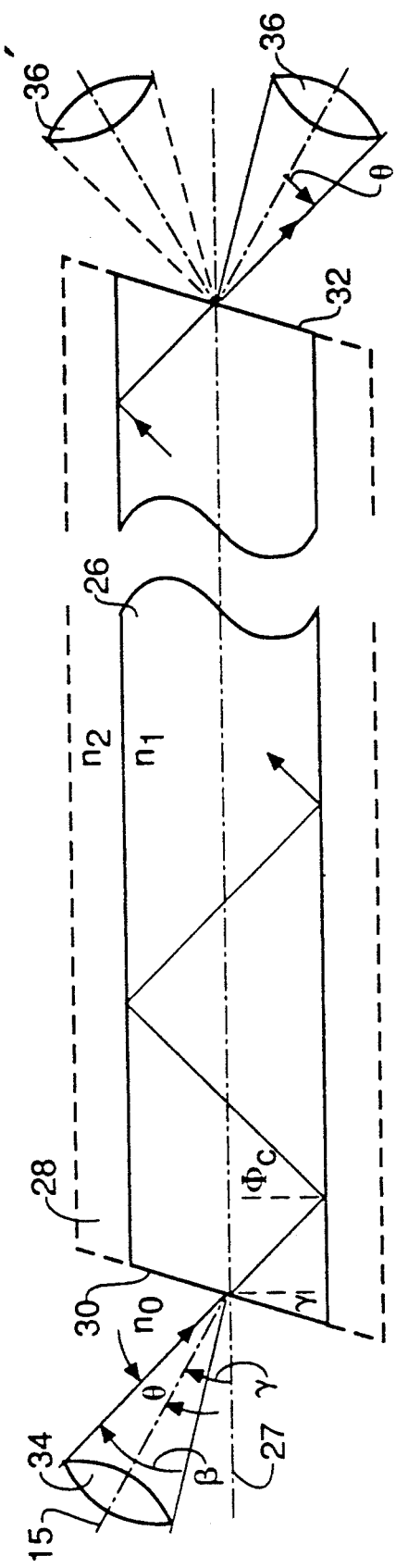
FIG. 5 is a ray path diagram through an angled optical fiber, which is useful in explaining the invention.

To understand this, consider the case as shown in FIG. 5 of an angled cylindrical fiber 26 with a refractive index $n_1$ embedded in (or clad with) a medium 28 of refractive index $n_2$, where $n_1 > n_2$. A ray of light passing through the fiber axis 27 from a medium of refractive index $n_0$ is incident onto the slanted input face 30 of the fiber at an angle $\gamma \pm \theta$, where the angle $\gamma$ is the angular difference between the fiber axis 27 and the optical axis 15, and the angle $\theta$ is the half-angle of an entrance light cone 34. These rays are refracted at the input face 30 and will be totally reflected at the fiber wall if their angle of incidence against the fiber wall is greater than the critical angle $\phi_c$. Each ray will be transmitted through the fiber 26 by internal reflection until it is again refracted by the angled output face 32, and exits the fiber at the same angle $\gamma + \theta$ at which it entered, where the angle $\theta$ is now the half-angle of an exit cone 36 of light output by the fiber. Due to the circularity of the entrance light cone 34, and its off-axis entrance into the cylindrical fiber 26, the exit light cone 36 traces an annular pattern around the output face 32 of the fiber 26. This is shown in perspective in FIG. 6 as a blur annulus 38, or in cross section in FIG. 5 as a pair of exit cones 36 and 36'. In either case, the annular pattern has a mean radius r that is substantially constant. Only the angle $\theta$, and thus the thickness t of the blur annulus 38, change with changes in aperture. Accordingly, the angle $\gamma + \theta$ defines the half-angle of the blur cone of light output by the fiber, i.e., twice the angle $\Gamma + \theta$ is the blur cone angle as the term is used herein, which is the output angle $\psi$ shown in FIG. 6.

The maximum value $(\gamma + \theta)_m$ for which the ray will be totally reflected can be derived from Snell's law and simple trigonometry, and leads to the following relationship:

$$n_0 \sin (\gamma + \theta)_m = (n_1^2 - n_2^2)^{\frac{1}{2}} \quad (1)$$

By analogy with lens optics, the term $n_0 \sin (\gamma + \theta)_m$ is called the numerical aperture and is a measure of the light gathering power of the fiber. Rays incident on the face 30 at greater than $(\gamma + \theta)_m$ will strike the fiber wall at angles less than $\phi_c$. Such rays will not be totally internally reflected and will quickly leak out of the fiber 26. As appreciated from the structure shown in FIG. 6, such rays could leak into adjoining fibers and eventually cause flare at the output of the array 16.

From an inspection of equation (1) it may be appreciated that the respective indices $n_1$ and $n_2$ of refraction for the fiber and cladding may be chosen ($n_1$ sufficiently larger than $n_2$) so as to force the $\sin (\gamma + \theta)_m$ to equal one. For air at the input, (i.e., $n_0 \approx 1$), this means that the largest numerical aperture equals one. Therefore, if the refractive indices of the core and cladding are sufficiently different that $$n_1^2 > n_2^2 + 1 \quad (2)$$

light at all incident angles is transmitted through the fiber (except for small losses due to Fresnel reflection at input and output faces, and for rays approaching at grazing angles to the input face). In this case, the angle $(\gamma + \theta)_m$ equals 90° and the fiber totally internally reflects substantially all light entering its face 30. In practical use of the imaging apparatus 14, the collection angle $\beta$ is less than the maximum collection angle $2(\gamma + \theta)_m$ because the actual aperture value is restricted by the diaphragm 13.

Figure 6:
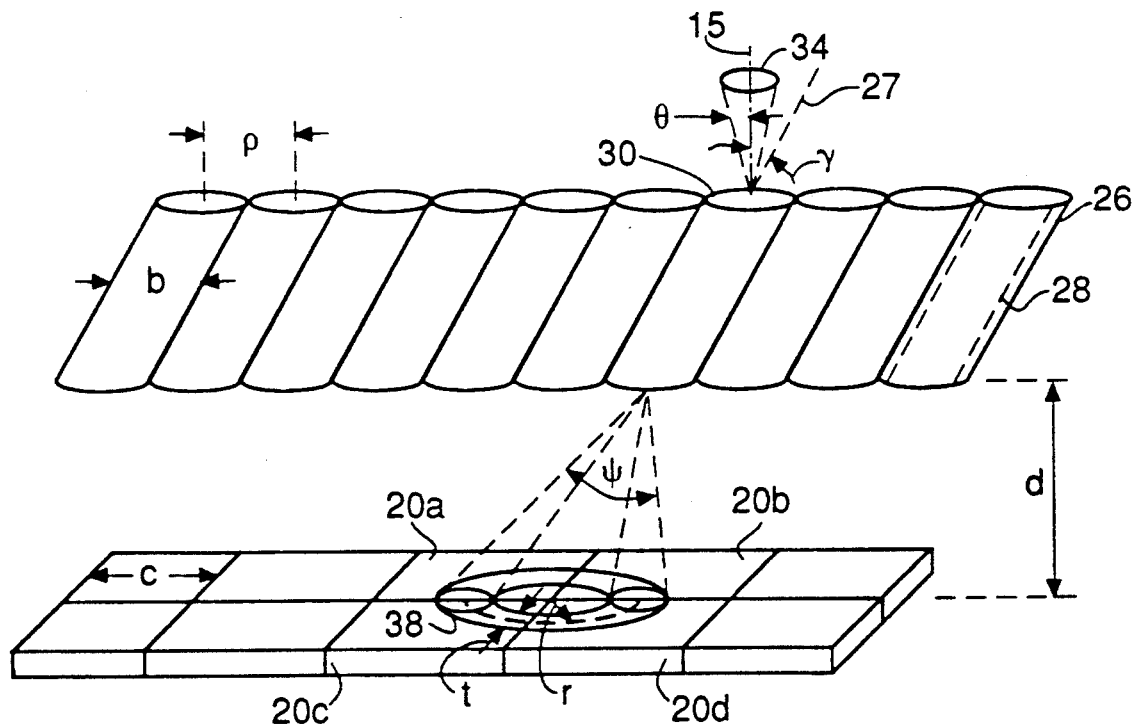
FIG. 6 is an enlarged view of the arrangement of FIG. 4, showing the relationship between the fibers and the photosites.

Referring again to FIG. 6, the pitch p of the optical fiber array 16 is selected such that the cross section b of each fiber 26 is less than the cross section c of each photosensitive element 20. This is done to insure that the full resolution of the image sensor 18 is obtained. For example, fibers with a fiber pitch equal to the pitch of the photosensitive elements compromise the resolution of the image sensor 18 because the conventional hexagonal packing pattern for such fiber arrays prevents accurate alignment of the fibers with the photosites. Consequently, as shown in FIG. 6, fibers are used that are smaller in cross section than the photosites. As also shown in FIG. 6, the optical fiber array 16 is spaced a small distance d from the sensor 18 so that the output blur angle $\psi$ of the emitted light from each fiber 26 covers a substantial proportion of at least two photosensitive elements 20. Thus, in addition to the integrating effect of the fiber, the coverage of its output blur angle $\psi$ further blurs the image and removes periodic image structure introduced by the optical fiber array. Since the diagram shown in FIG. 6 is a perspective view, and the output blur angle $\psi$ occupies a conic-like volume having a annular cross-section, the light emitted by each fiber 26 will ordinarily be the blur annulus 38 occupying a two-dimensional configuration of photosensitive elements 20, for example, a neighborhood of four adjacent elements 20a, 20b, 20c, and 20d. This produces a two-dimensional blur pattern useful in eliminating the problem of aliasing due to undersampling.

Referring to FIG. 6, the incoming cone of light 34 is shown to include a bundle of rays at angles up to $\theta$ from the normal to the input face 30, this normal being the optical axis 15 of the imaging apparatus. The angular relations are maintained through the fiber 26 such that, after multiple reflections down the length of the fiber 26, the entrance cone 34 of light has been converted into the output cone 36, which traces an annular section that projects as the blur annulus 38. As the radius of the incoming cone 34 changes, all that changes is the thickness t of the blur annulus 38. The mean radius r remains substantially constant. The effect of such a substantially constant mean radial coverage for two different apertures is shown in FIGS. 7A and 7B.

Figure 7A:
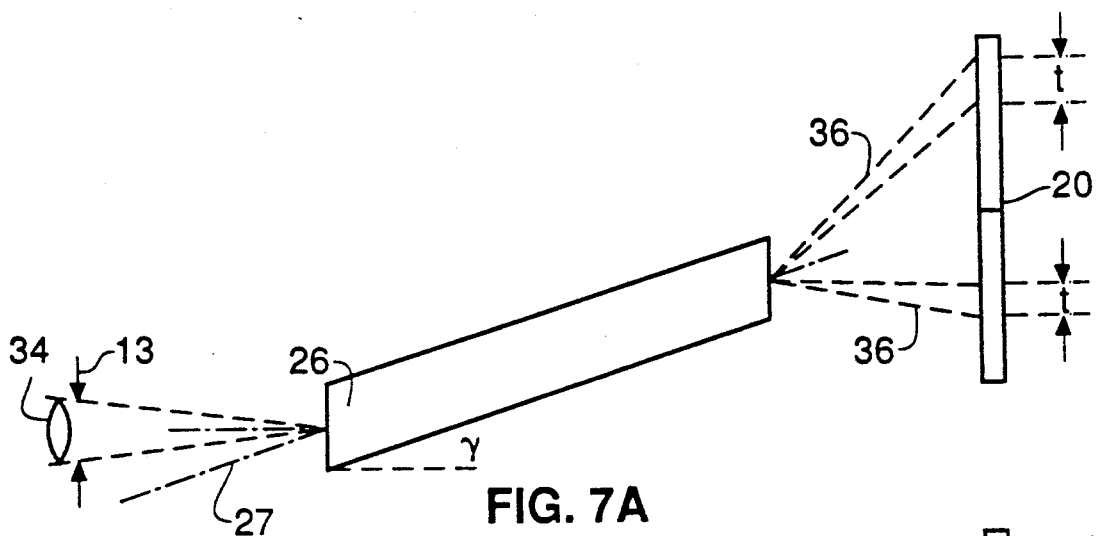
FIGS. 7A and 7B are diagrams of an angled optical fiber in the fiber array of FIG. 4, showing the effect of aperture change upon the exit angles and the blur pattern.
Figure 7B:
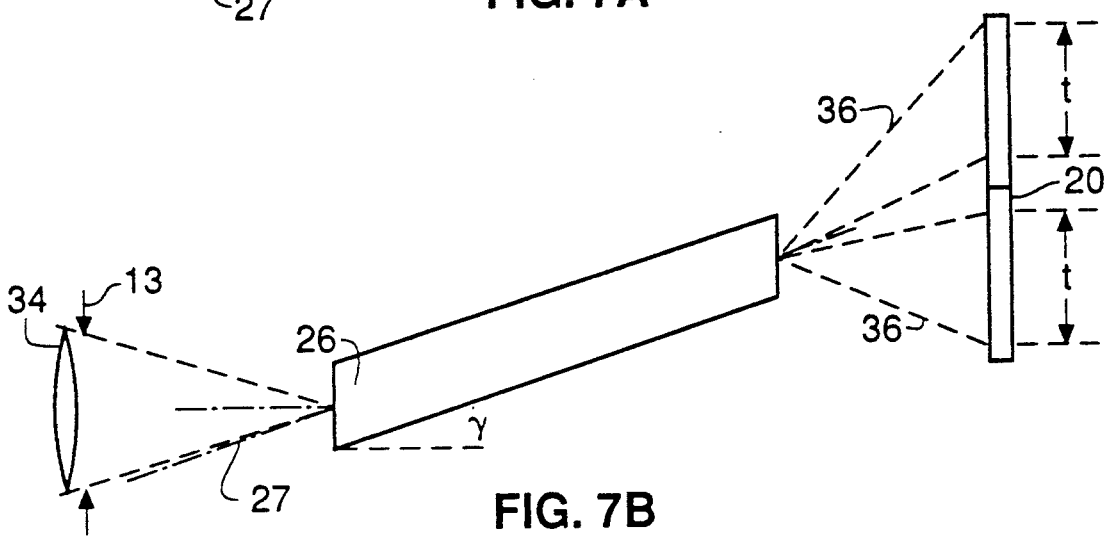
Figure 8A:
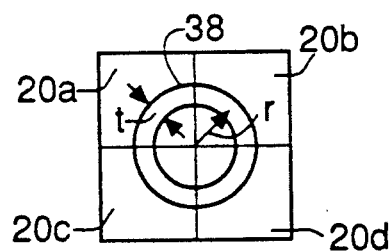
FIGS. 8A and 8B are diagrams of the blur patterns produced by the fibers of FIGS. 7A and 7B, shown superimposed over the photosites of the sensor.
Figure 8B:
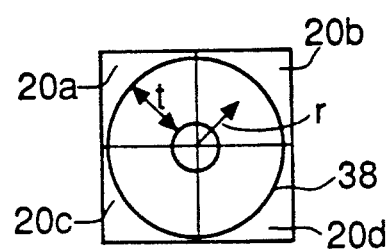

For a small aperture, such as f/number 32, FIG. 7A shows that the thickness t of the blur annulus 38 is relatively small but nonetheless spreads over adjacent photosites 20. The extent of the blur pattern for the small aperture of FIG. 7A is shown in FIG. 8A for neighboring photosites 20a, 20b, 20c, and 20d. For a large aperture, such as f/number 2.8, FIG. 7B shows that the thickness t of the blur annulus 38 is relatively large, and spreads over a large proportion of the photosites 20a, 20b, 20c, and 20d, as shown in FIG. 8B. In either case, the mean radius r remains substantially the same. By keeping the mean radial coverage approximately the same, the effect of an aperture change upon the blurred image can be reduced to a manageable level.

The optical fiber array 16 shown in FIG. 4 is a thin plate, having a thickness on the order of a fraction of a millimeter, e.g., about 500 microns. The only requirement is that incoming light can reflect from the fiber walls a multiplicity of times so as to achieve an integrating effect. The separation distance d between the sensor 18 and the optical fiber array 16 depends upon the diameter b of the fibers, the cross section c of the photosites, and the amount of blur desired (i.e., the width ψ of the blur pattern, see FIG. 6). It is expected that the distance d would typically be a few tens of microns for typical values of the other parameters.

In one application, the optical fiber array 16 is a fiber optic faceplate cut at an angle of 10° to the fiber axis 27 so that the fibers are oriented at 10° with respect to the top and bottom surfaces of the faceplate. The fibers are 6 microns in size, and the faceplate is 500 microns thick. The fiber material was CF-70 MEGAdraw Zero-Shear, supplied by Incom Inc., Southbridge, Mass. Being cut at an angle, the fibers (if round) will have faces that appear ellipsoidal when viewed normally to the flat output surface. The projection of the output angle ψ onto the sensor will actually be slightly non-circular. The effect is small, however, and the preceding description (based on the annular pattern of the blur annulus 38) is sufficiently accurate for a description of the invention and its benefits.

The use of an angled optical fiber array in accordance with the previous embodiments provides a number of advantages, as follows. A near ideal optical low pass filter function is achieved since all spatial frequencies above one-half the fiber-optic pitch (the Nyquist rate of the fiber) are eliminated. Unlike a birefringement filter, a two-dimensional blur spot is obtained with one device (instead of with two birefringent plates). Moreover, the low pass filter function is independent of optical wavelength, polarization, and lens focal length. The angled optical fiber array can be made physically small enough to fit into systems with space limitations. Most importantly, the blur pattern provided by the angled array is minimally sensitive to changes in lens aperture.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

For instance, the cladding surrounding the fibers may be selected so as to permit evanescent field coupling between adjacent fibers. This effect results in an optical low pass characteristic. Since evanescent field coupling is dependent on the angle of incidence of incoming light rays (the entrance cone angle), it is useful to employ an angled optical fiber array in accordance with the invention to minimize the variation of the incoming light cone angle with lens aperture.

PARTS LIST

1 OBJECT
2 LENS
3 OPTICAL FIBER ARRAY
4 IMAGE SENSOR
5 PHOTOSITES
6 OPTICAL FIBERS
7 EXIT CONE OF LIGHT
7A SMALL EXIT CONE
7B LARGE EXIT CONE
8 DIAPHRAGM
9A SMALL BLUR SPOT
9B LARGE BLUR SPOT
10 OBJECT
12 LENS SYSTEM
13 DIAPHRAGM
14 IMAGING APPARATUS
15 OPTICAL AXIS
16 OPTICAL FIBER ARRAY
18 IMAGE SENSOR
20 ARRAY OF PHOTOSITES
22 OUTPUT SECTION
24 IMAGE SIGNAL
26 OPTICAL FIBER
27 LONGITUDINAL FIBER AXIS
28 CLADDING
30 INPUT FACE
32 OUTPUT FACE
34 ENTRANCE LIGHT CONE
36 EXIT LIGHT CONE
38 BLUR ANNULUS

What is claimed is:

1. An imaging apparatus for generating an image signal from incident image light having its higher spatial frequencies limited to reduce undersampling artifacts, said apparatus comprising:
   an image sensor for generating the image signal from an array of photosites positioned relative to an optical axis; and
   an array of optical fiber oriented along a common fiber axis and interposed in the path of the incident image light with the fiber axis at an angle to the optical axis such that the optical fibers emit light over adjacent photosites so as to blur the image upon said sensor.

2. An imaging apparatus as claimed in claim 1 wherein said array of optical fibers is disposed a predetermined distance from said sensor so that said optical fibers provide a pattern of light that substantially covers at least two adjacent photosites.

3. An imaging apparatus as claimed in claim 1 wherein said optical fibers provide a pattern of light that covers a two-dimensional configuration of photosites.

4. An imaging apparatus as claimed in claim 1 wherein said optical fibers are smaller in cross section than the photosites.

5. An imaging apparatus for generating an image signal from incident image light having its higher spatial frequencies limited to reduce undersampling artifacts, said apparatus comprising:
   an image sensor for generating the image signal from a two-dimensional array of photosites disposed along an optical axis to receive the image light; and
   an array of optical fibers each having an axis oriented at an angle to the optical axis, said array interposed in the path of the incident image light relative to said sensor such that each optical fiber receives an entrance cone of light and emits a substantially annular pattern of light that covers a two-dimensional configuration of photosites so as to output a blurred image upon said sensor.

6. An imaging apparatus as claimed in claim 5 wherein said array of optical fibers is disposed at a sufficient distance from said sensor that the pattern of light spreads over the configuration of photosites.

7. An imaging apparatus as claimed in claim 5 wherein a lens is used to direct the image light upon the optical fiber array.

8. An imaging apparatus as claimed in claim 5 wherein the entrance cone of light received by each fiber is variable in angle, and wherein the substantially annular pattern of light emitted by each fiber is substantially constant in radius regardless of such variation.

9. An imaging apparatus for generating an image signal from incident image light having its higher spatial frequencies limited to reduce undersampling artifacts, said apparatus comprising:

an image sensor for generating the image signal from a two-dimensional array of photosites;

an optical section for directing the image light along an optical axis toward the sensor and for regulating the optical aperture;

an array of optical fibers having a common fiber axis oriented at an angle with respect to the optical axis, said array interposed in the path of the incident image light relative to said sensor such that each optical fiber emits a substantially annular pattern of light that covers a two-dimensional configuration of photosites so as to output a blurred image upon said sensor, wherein said substantially annular pattern has a mean radius that is substantially constant with changes in the optical aperture.

10. An imaging apparatus as claimed in claim 9 wherein said array of optical fibers is disposed at a sufficient distance from said sensor that the substantially annular pattern of light spreads over the configuration of photosites.

11. An imaging apparatus as claimed in claim 9 wherein said optical fibers are disposed in an ordered pattern in said array.

* * * * *